United States Patent [19]
Gorski

[11] Patent Number: 5,250,250
[45] Date of Patent: Oct. 5, 1993

[54] PROCESS FOR FORMING ARTIFICIAL ROCKS

[76] Inventor: Dennis Gorski, 21252 Bristlecove, Mission Viejo, Calif. 92692

[21] Appl. No.: 762,626

[22] Filed: Sep. 19, 1991

[51] Int. Cl.⁵ .............................................. B29C 33/40
[52] U.S. Cl. ...................... 264/227; 264/225; 264/273
[58] Field of Search ............. 264/220, 225, 227, 259, 264/273; 428/15

[56] References Cited

U.S. PATENT DOCUMENTS

| | | | |
|---|---|---|---|
| 51,366 | 12/1865 | Truesdale et al. | 264/220 |
| 779,979 | 1/1905 | Walter | 264/220 |
| 3,379,812 | 4/1968 | Yakovou | 264/227 |
| 3,950,477 | 4/1976 | Di Giacomo | 264/226 |
| 4,043,826 | 8/1977 | Hum | 264/333 |
| 4,385,088 | 5/1983 | Baskin | 428/15 |
| 4,446,091 | 5/1984 | Pairaudeau et al. | 264/225 |
| 4,668,451 | 5/1987 | Langson | 264/220 |
| 4,940,558 | 7/1990 | Jarboe et al. | 264/220 |

FOREIGN PATENT DOCUMENTS

| | | | |
|---|---|---|---|
| 982932 | 6/1951 | France | 264/220 |
| 1283542 | 12/1961 | France | 264/227 |

OTHER PUBLICATIONS

Faux Rocks, brochure by Rock & Waterscape Systems, Inc. No date available.

Primary Examiner—Jay H. Woo
Assistant Examiner—Robert B. Davis
Attorney, Agent, or Firm—Stetina and Brunda

[57] ABSTRACT

A process for forming an artificial rock is provided. The process includes forming an outer mold having an outer surface and inner surface, the inner surface defining the size, shape and detail of the artificial rock to be formed. An inner mold is formed to be receivable within the outer mold. The inner mold and outer mold are secured in place relative to each other to define a space therebetween. Molding material is poured into the space between the inner mold and outer mold. The molding material is allowed to harden to form an artificial rock within the space. The molds are then separated leaving the artificial rock.

16 Claims, 2 Drawing Sheets

PROCESS FOR FORMING ARTIFICIAL ROCKS

FIELD OF THE INVENTION

The present invention relates to a process for forming landscaping objects, such as hollow rocks useful in landscaping for residences and businesses.

BACKGROUND OF THE INVENTION

Landscape rocks and boulders have long been used as in landscaping to provide a natural effect and to highlight certain areas. To use actual boulders, it is necessary to find suitably shaped boulders, transport them to the location to be used and then dig the ground around the boulder such that it rests within the ground at a suitable height. This process is obviously time consuming and burdensome. A variety of alternatives to natural boulders have been developed.

Contemporary landscape architects utilize artificial boulders, which are actually hollowed out boulder liners or shells, having a bottom portion cut off to fit flush on the ground. Such liners are typically formed of concrete which is formed from a mold. The mold, in turn, is formed from an actual boulder which has been selected for its size, shape and design characteristics. By varying the composition or surface treatment of the boulder liner, different colors or surface characteristics can be obtained.

Though contemporary landscape boulder liners have significant functional and economic advantages over actual boulders, the current processes for forming such landscape boulders suffer significant shortcomings which impede both production rate and the quality of the resulting landscape boulders. The quality of such landscape boulders may be measured by how closely the surface of the landscape boulder reflects the surface details of the actual boulder used in the formation process.

Contemporary processes for forming landscape boulders typically use fiberglass molds made by forming a latex skin on the surface of the actual boulder, and then constructing the fiberglass mold around the latex skin. Cement is pumped or hand troweled into the inverted fiberglass mold and allowed to set. The only force acting on the cement is its own weight. By the action of gravity, the cement generally moves downward toward the bottom of the mold, i.e., representing the upper portion of the landscape boulder when the process is complete. Consequently, the resulting product typically does not assume all surface characteristics of the mold. This deficiency is particularly significant in the upper and side portions of the inverted landscape boulder. In order to remedy the deficiencies of the product formed by such processes, it is typically necessary to apply additional cement by hand to the lower outside portions of the completed landscape boulder, resulting in the addition of non-repeating detail which is only vaguely reminiscent of the initial boulder. As will be evident from the above description, such contemporary processes have significant deficiencies with respect to both the quality of the resulting product and the production rate. The present invention addresses these and other deficiencies in the prior art as set forth below.

SUMMARY OF THE INVENTION

A process for forming an artificial rock is disclosed. The process comprises forming an outer mold having an outer surface and inner surface, the inner surface defining the size, shape and detail of the artificial rock to be formed. An inner mold is formed to be receivable within the outer mold. The inner mold and outer mold are secured in place relative to each other to define a space therebetween. Molding material is poured into the space between the inner mold and outer mold. The molding material is allowed to harden to form an artificial rock within the space. The molds are then separated leaving the artificial rock.

The void between the inner mold and outer mold defines the thickness of the resulting landscape boulder, which can be regulated by varying the size of the inner mold, and the clearance between the inner and outer molds.

In the presently preferred embodiment, the inner mold is made by forming a hard liner on the outer mold and carving a body of foam into a mold insert. The mold insert may further be provided with a plurality of holes into which the molding material may flow. Molding material is poured into the space between the hard liner and mold insert, attaching to the mold insert. Upon hardening of the molding material, the molds are separated and the hard liner may be discarded. The inner mold is then complete.

The outer mold may be formed by a variety of different processes. In the presently preferred embodiment, an outer mold is formed by building a dam about a actual boulder to a height defined by a molding line. The dam is filled with molding material and allowed to harden to form the shape of the outer mold.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be implemented or utilized. The description sets forth the functions and sequence of steps of constructing a landscape boulder in connection with the illustrated embodiments. It is understood, however, that the same or equivalent process steps may be accomplished by different embodiments and that objects other than landscape boulders may be replicated in accordance with the disclosed process. Such equivalent process steps and process products are also intended to be encompassed within the spirit and scope of the invention.

The first step in the formation of landscape objects is the selection of a rock or other object suitable for molding. Not all objects can be molded. Rocks with deep impressions or angled undercuts may pose significant problems upon removal of the casting. Rocks with minimal undercuts are selected and a molding line is determine prior to set up. The molding line is an imaginary plane which passes through the rock eliminating that portion of the rock which may be unsuitable for molding due to unacceptable undercuts and/or impressions.

Figure 1:
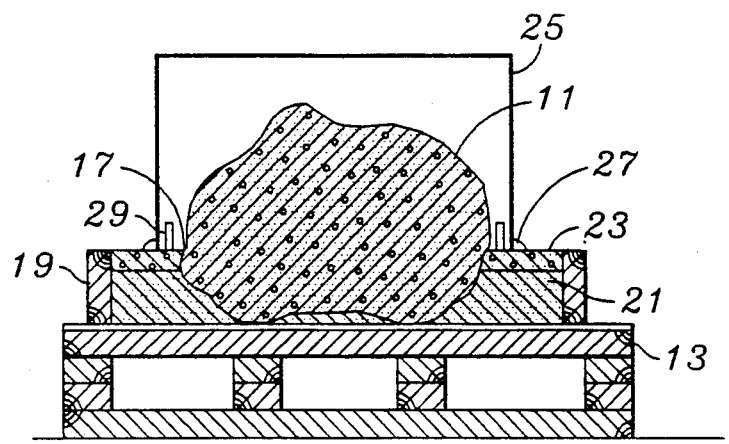
FIG. 1 is a side view of the apparatus used to form a mold in accordance with the present invention.
Figure 2:
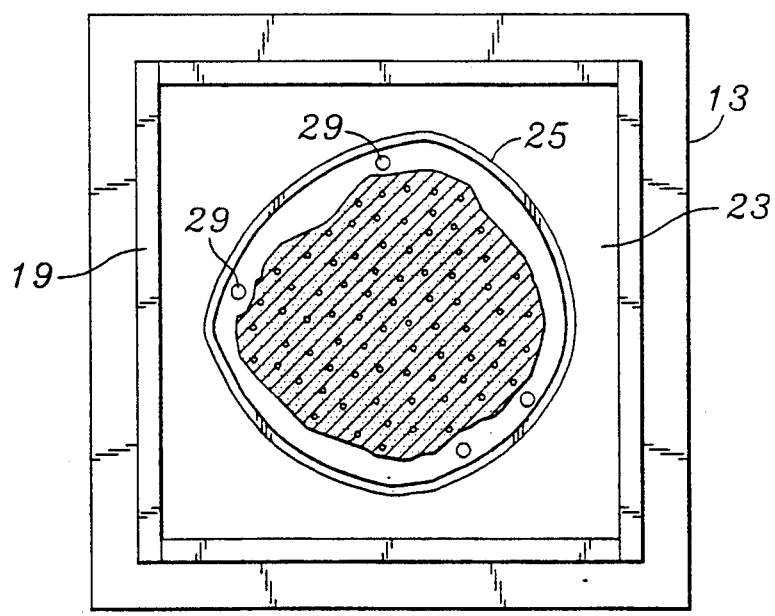
FIG. 2 is a top view of the apparatus used to form a mold in accordance with the present invention.

As illustrated at FIG. 1 and 2, once an appropriate rock 11 is selected, the rock 11 is placed upon a support platform 13. The support platform 13 supports the rock 11 and set-up material in a level position. The platform is preferably constructed for mobility, incorporating mounting wheels or being constructed to allow forklift use.

After the platform 13 is constructed, the rock 11 is centered on the platform with the molding line level. The molding line 17 is typically above the platform. A frame 19 is then constructed around the rock and fastened down to the platform. The depth of the frame 19 is defined by the distance between the molding line 17 and the upper surface of the support platform 13. The length and width of the frame are preferably formed to be adequate to allow 5 or 6 inches between the inside of the frame 19 and the surface of the rock 11. The void 21 between the frame 19 and the rock 11 is filled with sand and packed firm to within 1-2 inches of the molding line 17. This 1-2 inches is a formed concrete base 23, troweled smooth and level, and allowed to dry. The concrete base 23 and rock 11 are preferably both sealed with an appropriate sealer, such as shellac, and coated with a mold release agent.

The next step in the formation of the mold is to put a sheet metal dam in place. In the presently preferred embodiment, sheet metal of 26 gauge is cut to a width that exceeds the dimension between the molding line and the pour line. The length exceeds the circumference of the rock with an allowance of at least 1-2 inches between the rock 11 and the dam wall. The sheet metal dam 25 is carefully bent around the rock 11 allowing 1-2 inches for molding material. The overlap of the sheet metal may be joined with duct tape on both sides. With the sheet metal dam 25 in place, a ring of cement grout 27 is applied to the outside bottom edge with a grouting bag. The purpose of cement grout 27 is to hold the sheet metal in place and to seal the joint between the sheet metal dam 25 and the concrete base 23. When the grout is dry, a release agent is applied to the inside surface of the sheet metal.

The next step is the placement of the alignment fasteners. Alignment fasteners 29 are later used to hold down and properly align the inner mold with respect to the outer mold. In the presently preferred embodiment, the alignment fasteners 29 are steel dowels with female threads embedded in the surface of the outer mold. The placement of the alignment fasteners 29 is significant in that they are preferably positioned to equalize the upwards stress on the outer mold, uniformly distributing the stress of holding down the inner mold.

With the alignment fasteners in position, molding material is then poured into place. In the presently preferred embodiment, the molding material used is a polyurethane compound, two component system. However, various types of molding material may be used within the scope of the invention. When mixed together, the molding material cures at room temperature to an elastomer with shore "A" hardness of 40-60. When the molding material has dried, the resulting mold, i.e., outer mold 31, is removed from the rock and placed upright with the impression facing up.

Figure 3:
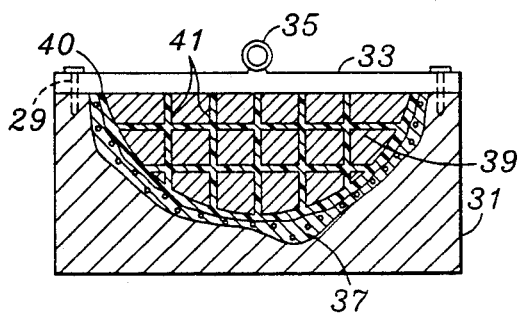
FIG. 3 is a side view illustrating the outer and inner molds.
Figure 4:
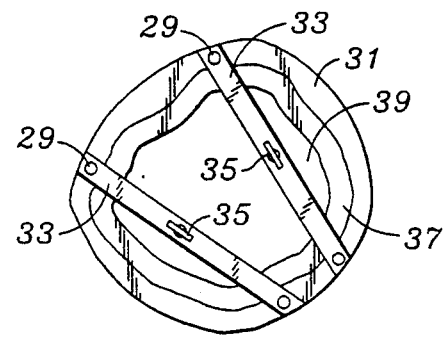
FIG. 4 is a top view illustrating the outer and inner molds.
Figure 5:
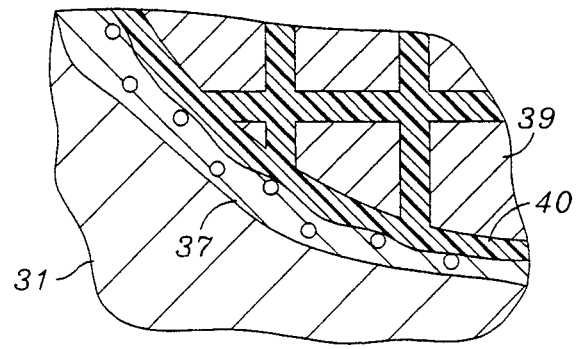
FIG. 5 is an enlarged view of a portion of FIG. 3.

Referring to FIGS. 3 and 4, the next step in the process is the formation of a hard liner 37 on the inside surface of the outer mold 31. As described below, once the mold is complete, it will function to reproduce products which are substantially replicas of the hard liner 37. To form the hard liner, cement or other similar materials is hand trolled on the inner surface of the outer mold. The thickness of the mixture depends upon the size of the rock to be produced and the strength desired, typically between ⅜ and 3 inches thick. The inside surface of the hard liner 37 is typically formed to have a smooth bowl shape. A sealer and release agent are then applied to the exposed surface of the hard liner as described above.

Next, a foam insert is then placed within the outer mold. The insert 39 is formed of a rigid polyurethane foam, carved and shaped to substantially fill the space of the hard liner, leaving approximately ¼ to 1 inch of space between the rigid foam and the hard liner on all sides. The space remaining between the hard liner 37 and foam insert is filled with liquid molding material 40, as described below. ¼ to 1 inch holes 41 are preferably drilled through the foam in all directions, particularly where the alignment brackets touch the foam. This procedure prevents the hardened molding material from pulling away from the foam insert during mold separation.

Alignment brackets 33 are used to hold down and properly align the foam insert 39 to the outer mold. The alignment brackets may be formed of wood, metals or plastic and is formed to be of size and strength sufficient to hold the inner mold without bowing under stress created by buoyancy during the casting process. The brackets 33 are centered over the alignment fasteners 29, with holes marked and drilled for an anchor bolt. The brackets are preferably marked and cut to fit the outside edge of the outer mold. With the brackets 33 in place, the center of each bracket is identified and marked. At each mark, a hole is drilled to attach a ⅜ or ¼ inch eyebolt 35. The eyebolt is used to pull up on when separating the inner mold from the casting.

Molding material 40, such as polyurethane, is then poured into the space between the hard liner and the foam insert. Once half poured, the buoyancy of the foam insert upon the molding material will typically urge the foam upwards against the alignment brackets. The foam insert may then be manually manipulated in order to provide circumferential clearance between the foam insert and the hard liner. The pouring is then completed. When the molding material 40 is dried, the foam insert incased in molding material now attached thereto, is separated from the hard liner. The hardened molding material 40 and foam insert 39 collectively become the inner mold. The hard liner may then be separated from the outer mold and discarded or may be used as a landscape boulder.

Figure 6:
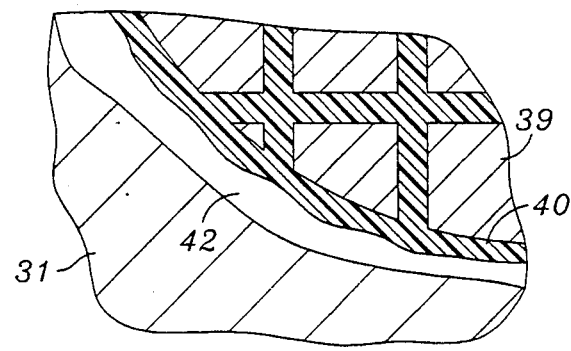
FIG. 6 is an enlarged view of a portion of FIG. 3, wherein the hard liner has been removed to provide space for the cement mixture.

In the production of landscape boulders, as shown at FIG. 6, the outer and inner molds are again mated and the cement mixture is poured into the intermediate space 42 previously occupied by the hard liner. After the cement mixture hardens, the outer and inner molds are separated, leaving a landscape boulder. This process is then repeated to make additional landscape boulders.

The use of the inner mold to form the landscape boulder substantially equalizes and provides a means to effectively regulate the thickness of the landscape boulder around its entire surface area. Though variations in such thickness may occur as a consequence of the irregularity of the desired surface, the landscape boulder may be formed so that all portions of the landscape boulder have a minimum thickness without requiring an excess of cement mixture or other molding material. Moreover, the use of the inner mold provides a further advantage that the cement mixture is urged against the side walls of the mold to a greater degree than that resulting from contemporary process of simply pumping or shooting casting material into the mold. As a consequence, products formed in accordance with the present invention can obtain significantly greater detail on a repeatable basis, substantially eliminating the need for any hand troweling of the product after it is withdrawn from the mold. Consequently, the production rate that can be achieved by use of the present inventive process is significantly greater than that achieved by contemporary processes.

As will be apparent to those of ordinary skill in the art, the present invention has application beyond merely the reproduction of landscape boulders. Other types of landscape objects, such as objects for decorating pools or buildings may be reproduced in accordance with the same process as described above. Accordingly, the present invention is not intended to be limited to the particular types of objects being reproduced.

As will further be apparent to those of ordinary skill in the art, the process may be modified or supplemented to provide various types of surface coloring or detail. For example, a more granular surface may be provided by spray application of commercially available surface finish products. Coloring finishes may also be applied in accordance with techniques well-known in the art to those of ordinary skill in the art.

It should also be recognized that various aspects of the present invention may be implemented in conjunction with inner and/or outer molds formed in accordance with different methods or construction. Accordingly, the description of the presently preferred embodiments of the overall process, described above, are not intended to be limiting of the particular combination of process steps which constitute the present invention.

What is claimed is:

1. A process of forming a mold useful in the production of artificial rocks comprising:
   forming an outer mold, said mold having an outer surface and an inner surface, said inner surface defining the size, shape and detail of the artificial rock;
   forming a hard liner upon the inner surface of the outer mold;
   forming a mold insert receivable within the hard liner;
   securing said mold insert and hard liner in place relative to each other to define a space between the mold insert and the hard liner;
   pouring molding material into the space between the mold insert and the hard liner;
   allowing the molding material to harden;
   separating the outer mold from the mold insert and attached molding material, the mold insert and attached molding material collectively forming an inner mold; and
   separating the hard liner from the outer mold.

2. The process as recited in claim 1 wherein the step of pouring molding material into the space between the mold insert and hard liner comprises filling the space with urethane.

3. The process as recited in claim 1 further comprising the step of regulating the thickness of the mold by varying the size and shape of the hard liner.

4. The process as recited in claim 1 wherein the step of forming a mold insert comprises carving a body of foam to have a shape substantially conforming to the hard liner inner surface.

5. The process as recited in claim 4 wherein the step of forming a mold insert further comprises the step of forming a plurality of holes through the insert into which molding material may flow.

6. The processes recited in claim 1 wherein the hard liner is formed to have a substantially uniform thickness.

7. The process as recited in claim 1 wherein the step of securing the mold insert and outer mold in place comprises the step of engaging upper surfaces of the mold insert and the outer mold by at least one fastening member.

8. The process as recited in claim 1 wherein said step of forming an outer mold comprises:
   disposing a natural rock to be reproduced on a platform;
   defining a molding line about the natural rock;
   forming a dam about the rock to a level defined by the molding line;
   filling the dam with molding material; and
   allowing the molding material to harden to form the outer mold.

9. A process of forming artificial rocks comprising:
   forming an outer mold, said mold having an outer surface and an inner surface, said inner surface defining the size, shape and detail of the artificial rock;
   forming a hard liner upon the inner surface of the outer mold;
   forming a mold insert receivable within the hard liner;
   securing said mold insert and outer mold in place relative to each other to define a space between the outer mold and the mold insert;
   pouring molding material into the space between the mold insert and the hard liner;
   allowing the molding material to harden;
   separating the outer mold from the mold insert and attached molding material, the mold insert and attached material collectively forming an inner mold;
   separating the hard liner from the outer mold;
   joining the inner mold and outer mold together;
   pouring molding material into the space between the inner and outer mold and allowing the material to harden; and
   separating the inner and outer mold to release an artificial rock.

10. The process as recited in claim 9 wherein the step of pouring molding material into the space between the mold insert and hard liner comprises filling the space with urethane molding material.

11. The process as recited in claim 9 further comprising the step of regulating the thickness of the artificial rock by varying the size and shape the hard liner.

12. The process as recited in claim 9 wherein the step of forming a mold insert comprises carving a body of foam to have a shape substantially conforming to the inner surface of the hard liner.

13. The process as recited in claim 9 wherein the step of forming an artificial rock further comprises the step of forming a plurality of holes through the insert into which molding material may flow.

14. The processes recited in claim 9 wherein the hard liner is formed to have a substantially uniform thickness.

15. The process as recited in claim 9 wherein the step of securing the mold insert and outer mold in place comprises the step of engaging upper surfaces of the mold insert and the outer mold by at least one fastening member.

16. The process as recited in claim 10 wherein said step of forming an outer mold comprises:
   disposing a natural rock to be reproduced on a platform;
   defining a molding line about the natural rock;
   forming a dam about the object to a level defined by the molding line;
   filling the dam with molding material; and
   allowing the molding material to harden to form the outer mold.

* * * * *